United States Patent
Ghai et al.

(10) Patent No.: US 8,930,629 B2
(45) Date of Patent: *Jan. 6, 2015

(54) DATA CACHE BLOCK DEALLOCATE REQUESTS IN A MULTI-LEVEL CACHE HIERARCHY

(71) Applicant: International Business Machines Corporation, Armonk, NY (US)

(72) Inventors: Sanjeev Ghai, Round Rock, TX (US); Guy L. Guthrie, Austin, TX (US); William J. Starke, Round Rock, TX (US); Jeff A. Stuecheli, Austin, TX (US); Derek E. Williams, Austin, TX (US); Phillip G. Williams, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 102 days.

This patent is subject to a terminal disclaimer.

(21) Appl. No.: 13/655,833

(22) Filed: Oct. 19, 2012

(65) Prior Publication Data
US 2013/0262770 A1 Oct. 3, 2013

Related U.S. Application Data

(63) Continuation of application No. 13/433,048, filed on Mar. 28, 2012.

(51) Int. Cl.
*G06F 12/08* (2006.01)
*G06F 12/12* (2006.01)

(52) U.S. Cl.
CPC ........ *G06F 12/0817* (2013.01); *G06F 12/0804* (2013.01); *G06F 12/121* (2013.01); *G06F 12/122* (2013.01)

USPC ........... 711/133; 711/144; 711/141; 711/119; 711/136

(58) Field of Classification Search
CPC ........................................ G06F 12/121–12/123
USPC .......................... 711/133, 136, 144, 141, 119
See application file for complete search history.

(56) References Cited

U.S. PATENT DOCUMENTS 6,202,129 B1  3/2001  Palanca et al.
6,370,618 B1  4/2002  Arimilli et al.
(Continued)

OTHER PUBLICATIONS

U.K. Intellectual Property Office, Great Britain patent application GB1303302.2; Combined Search and Examination Report dated Sep. 24, 2013. (6 pg).

(Continued)

*Primary Examiner* — Than Nguyen
(74) *Attorney, Agent, or Firm* — Russell Ng PLLC; Matthew Baca (57) ABSTRACT

In response to executing a deallocate instruction, a deallocation request specifying a target address of a target cache line is sent from a processor core to a lower level cache. In response, a determination is made if the target address hits in the lower level cache. If so, the target cache line is retained in a data array of the lower level cache, and a replacement order field of the lower level cache is updated such that the target cache line is more likely to be evicted in response to a subsequent cache miss in a congruence class including the target cache line. In response to the subsequent cache miss, the target cache line is cast out to the lower level cache with an indication that the target cache line was a target of a previous deallocation request of the processor core.

9 Claims, 10 Drawing Sheets

(56) References Cited

U.S. PATENT DOCUMENTS

| | | |
|---|---|---|
| 6,766,419 B1 * | 7/2004 | Zahir et al. .................... 711/133 |
| 7,055,003 B2 | 5/2006 | Cargnoni et al. |
| 7,284,094 B2 | 10/2007 | Hrusecky et al. |
| 7,343,455 B2 | 3/2008 | Bell, Jr. et al. |
| 7,401,189 B2 | 7/2008 | Bell, Jr. et al. |
| 2008/0177953 A1 | 7/2008 | Bell et al. |
| 2010/0015364 A1 | 1/2010 | Prevost |
| 2010/0153650 A1 | 6/2010 | Guthrie et al. |
| 2011/0072218 A1 | 3/2011 | Manne et al. |
| 2011/0161588 A1 * | 6/2011 | Guthrie et al. ................ 711/122 |
| 2011/0161589 A1 | 6/2011 | Guthrie et al. |

OTHER PUBLICATIONS

U.S. Appl. No. 13/433,048 entitled "Data Cache Block Deallocate Requests in a Multi-Level Cache Hierarchy"; Notice of Allowance dated Jun. 24, 2014.

U.S. Appl. No. 13/433,048 entitled "Data Cache Block Deallocate Requests in a Multi-Level Cache Hierarchy"; Non-final office action dated Jan. 31, 2014.

Jaleel, Aamer et al. "Adaptive Insertion Policies for Managing Shared Caches" pp. 1-12, Proceedings of the 17th Int'l Conference on Parallel Architectures and Compilation Techniques, Oct. 25-29, 2008.

Kharbutli, Mazen et al. "Counter-Based Cache Replacement Algorithms" pp. 1-9, Proceedings of the Int'l Conference on Computer Design, San Jose, CA Oct. 2-5, 2005.

* cited by examiner

DATA CACHE BLOCK DEALLOCATE REQUESTS IN A MULTI-LEVEL CACHE HIERARCHY

This application is a continuation of U.S. patent application Ser. No. 13/433,048 entitled "DATA CACHE BLOCK DEALLOCATE REQUESTS IN A MULTI-LEVEL CACHE HIERARCHY," by Sanjeev Ghai et al., filed on Mar. 28, 2012, the disclosure of which is incorporated herein by reference in its entirety for all purposes.

BACKGROUND OF THE INVENTION

1. Technical Field

The present invention relates in general to data processing and more particularly to handling the processing of requests to deallocate a data cache block in a cache memory of a data processing system.

2. Description of the Related Art

A conventional multiprocessor (MP) computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and generally is accessible for read and write access by all processing units. In order to reduce access latency to instructions and data residing in the system memory, each processing unit is typically further supported by a respective multi-level cache hierarchy, with each lower level generally having a successively longer access latency. Thus, a level one (L1) cache generally has a lower access latency than a level two (L2) cache, which in turn has a lower access latency than a level three (L3) cache.

To provide a balance between competing design considerations such as power dissipation, size, access latency and hit rates, many MP systems implement set-associative caches, which group cache entries in congruence classes each containing multiple entries for storing cache lines sharing a common address index. The removal (eviction) of cache lines from the entries in each congruence class is governed by a replacement policy, which is preferably selected to remove from the congruence class the cache line least likely to again be accessed. Common replacement policies include least-recently used (LRU) and round-robin.

For some workloads, the replacement policy implemented by the cache hardware is supplemented by additional software management of the cache(s). For example, in some cases, a programmer or compiler can insert explicit instructions in an application program to cause the cache hierarchy to invalidate particular cache lines or to flush particular cache lines to system memory. Examples of cache management instructions from the PowerPC instruction set architecture are listed in Table I below.

TABLE I

| PowerPC Mnemonic | Instruction name |
| --- | --- |
| DCBF | Flush Data Cache Line |
| DCBI | Invalidate Data Cache Line |
| DCBZ | Zero Data Cache Line |
| ICBI | Invalidate Instruction Cache Line |

In some cases, explicit cache management instructions can cause inefficiency in execution of an application program, for example, by invalidating a cache line or flushing the cache line to system memory prior to the cache line being accessed again. In such cases, the access to the cache line following the software-managed invalidation or flush will incur significantly increased access latency as the cache line must again be retrieved from system memory, which may have an access latency that is two orders of magnitude greater than the upper levels of the cache hierarchy.

SUMMARY OF THE INVENTION

In at least one embodiment, a data processing system includes a processor core supported by upper and lower level caches. In response to executing a deallocate instruction, a deallocation request specifying a target address of a target cache line is sent from a processor core to a lower level cache. In response, a determination is made if the target address hits in the lower level cache. If so, the target cache line is retained in a data array of the lower level cache, and a replacement order field of the lower level cache is updated such that the target cache line is more likely to be evicted in response to a subsequent cache miss in a congruence class including the target cache line. In response to the subsequent cache miss, the target cache line is cast out to the lower level cache with an indication that the target cache line was a target of a previous deallocation request of the processor core.

DETAILED DESCRIPTION OF ILLUSTRATIVE EMBODIMENT

Figure 1:
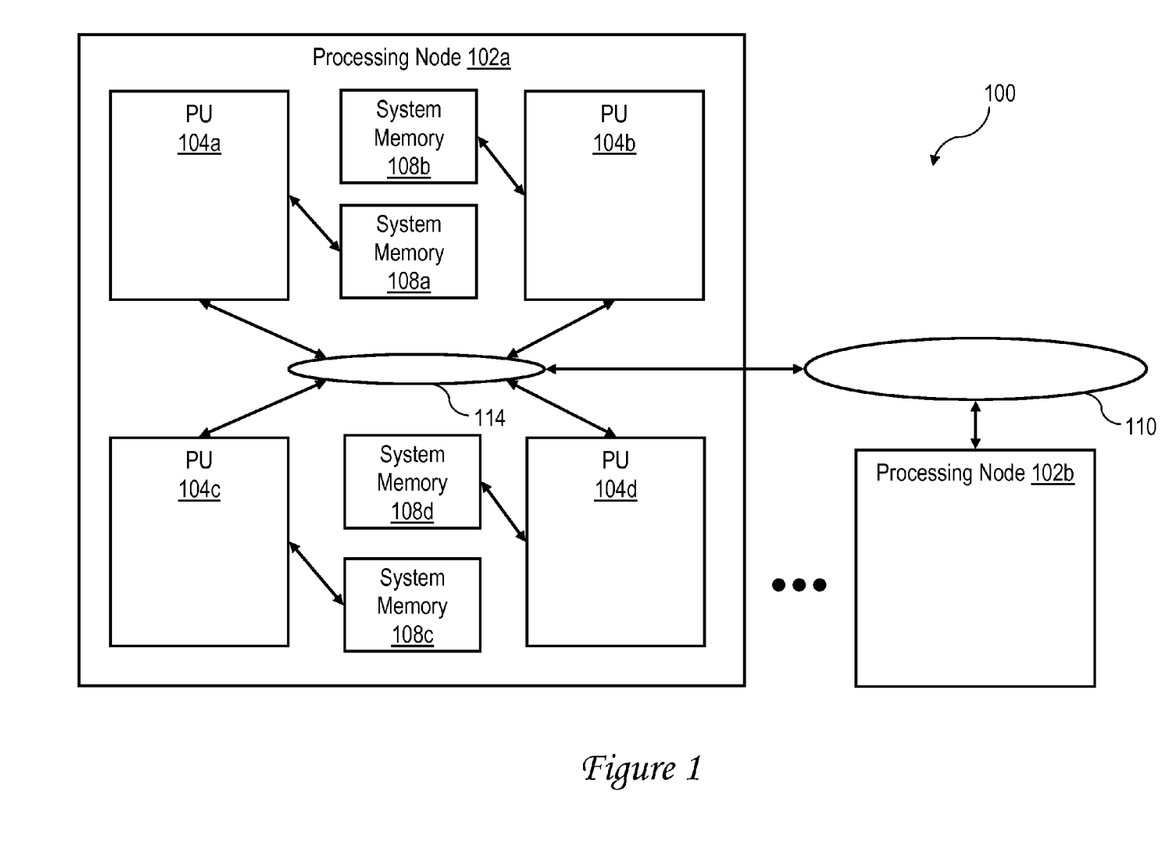
FIG. 1 is high level block diagram of an exemplary data processing system in accordance with one embodiment.

With reference now to the figures and, in particular, with reference to FIG. 1, there is illustrated a high level block diagram of an exemplary embodiment of a multiprocessor data processing system in accordance with the present invention. As shown, data processing system 100 includes multiple processing nodes 102a, 102b for processing data and instructions. Processing nodes 102a, 102b are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104a-104d within each processing node 102 are coupled for communication by a local interconnect 114, which, like system interconnect 110, may be implemented with one or more buses and/or switches. Local interconnects 114 and system interconnect 110 together form an interconnect fabric, which preferably supports concurrent communication of operations of differing broadcast scopes. For example, the interconnect fabric preferably supports concurrent communication of operations limited in scope to a single processing node 102 and operations broadcast to multiple processing nodes 102.

The devices coupled to each local interconnect 114 include not only processing units 104, but also one or more system memories 108a-108d. Data and instructions residing in system memories 108 can generally be accessed and modified by a processor core (FIG. 2A) in any processing unit 104 in any processing node 102 of data processing system 100. In alternative embodiments of the invention, one or more system memories 108 can be coupled to system interconnect 110 rather than a local interconnect 114.

Those skilled in the art will appreciate that data processing system 100 can include many additional unillustrated components, such as peripheral devices, interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to data processing systems of diverse architectures and are in no way limited to the generalized data processing system architecture illustrated in FIG. 1.

Figure 2A:
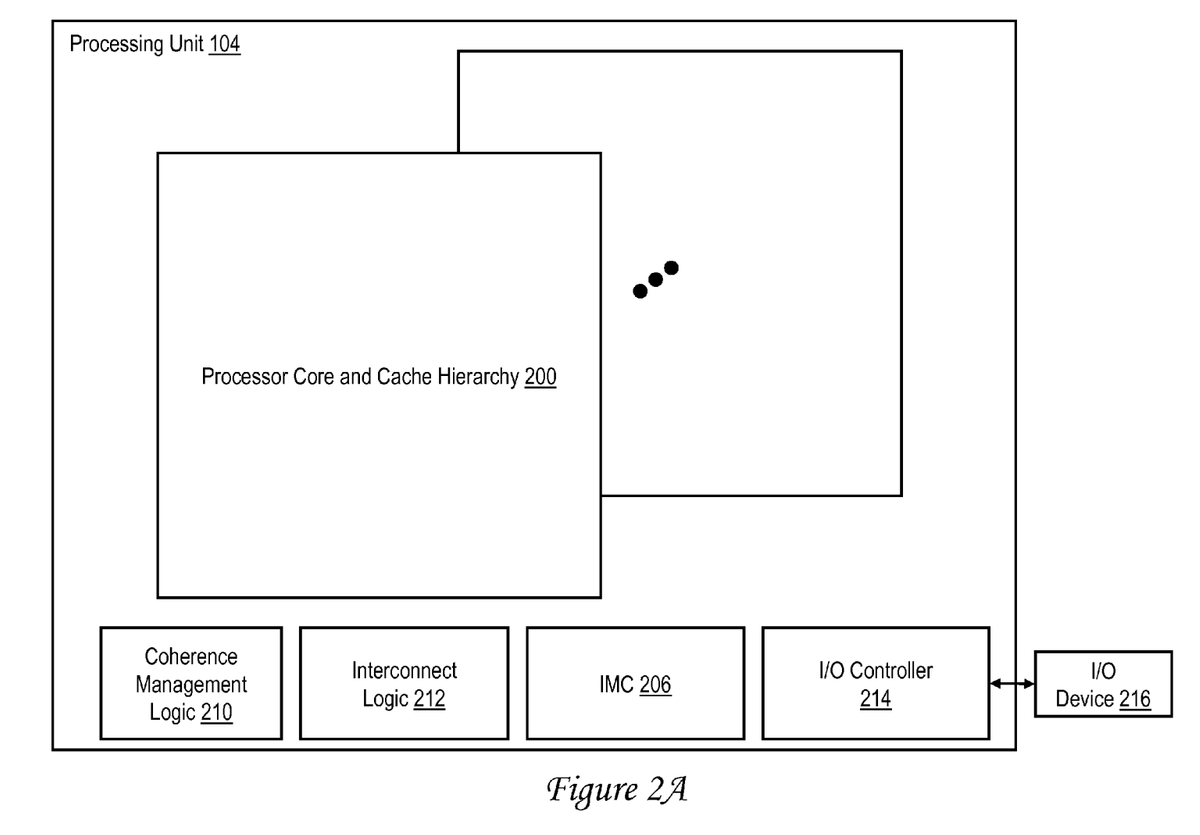
FIG. 2A is a high level block diagram of a processing unit from FIG. 1.

Referring now to FIG. 2A, there is depicted a more detailed block diagram of an exemplary processing unit 104 in accordance with the present invention. In the depicted embodiment, each processing unit 104 includes multiple instances of a processor core and associated cache hierarchy, which are collectively identified by reference numeral 200. In the depicted embodiment, each processing unit 104 also includes an integrated memory controller (IMC) 206 that controls read and write access to one or more of the system memories 108a-108d within its processing node 102 in response to requests received from processor cores and operations snooped on the local interconnect 114.

Still referring to FIG. 2A, each processing unit 104 also includes an instance of coherence management logic 210, which implements a portion of the distributed snoop-based coherency signaling mechanism that maintains cache coherency within data processing system 100. In addition, each processing unit 104 includes an instance of interconnect logic 212 for selectively forwarding communications between its local interconnect 114 and system interconnect 110. Finally, each processing unit 104 includes an integrated I/O (input/output) controller 214 supporting the attachment of one or more I/O devices, such as I/O device 216. I/O controller 214 may issue operations on local interconnect 114 and/or system interconnect 110 in response to requests by I/O device 216.

Figure 2B:
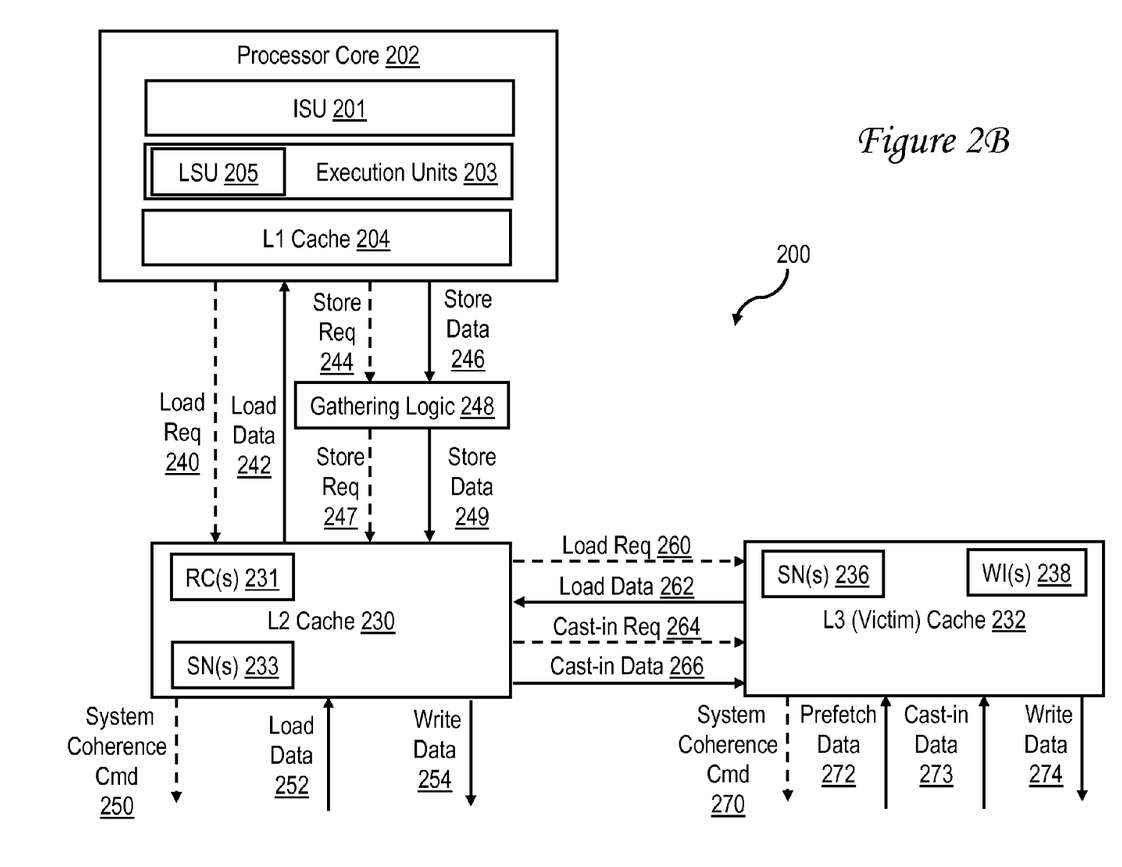
FIG. 2B is a more detailed block diagram of an exemplary embodiment of a processor core and associated cache hierarchy from FIG. 2A.

With reference now to FIG. 2B is a more detailed block diagram of an exemplary embodiment of a processor core and associated cache hierarchy 200 from FIG. 2A. Processor core 202 includes circuitry for processing instructions and data. In the depicted embodiment, this circuitry includes an instruction sequencing unit 201, which fetches instructions from the memory hierarchy and orders the instructions for execution, and one or more execution units 203, which execute instructions received from ISU 203. In the depicted embodiment, execution units 203 include a load-store unit (LSU) 205 that executes memory access instructions and cache management instructions to calculate target addresses and to generate corresponding memory access and cache management requests specifying the target addresses.

The operation of processor core 202 is supported by a cache memory hierarchy implementing a weakly ordered storage architecture, meaning that the cache memory hierarchy can generally perform store requests received from the affiliated processor core 202 out-of-order with respect to the program order of the associated store instructions executed by the processor core 202 and only enforces ordering between groups of store requests separated by a barrier operation. The cache memory hierarchy includes a store-through level one (L1) cache 204 within each processor core 202, a store-in level two (L2) cache 230 (which is preferably inclusive of L1 cache 204), and a lookaside L3 cache 232 that is utilized as a victim cache for L2 cache 230 and accordingly is filled by cache lines evicted from L2 cache 230. In contrast to many conventional victim cache arrangements, the contents of L3 cache 232 are not exclusive of the contents of L2 cache 230, meaning that a given memory block may be held concurrently in L2 cache 230 and L3 cache 232.

L3 cache 232 further includes at least one and preferably a plurality of snoop (SN) machine(s) 236 and at least one and preferably a plurality of write inject (WI) machine(s) 238 within snooper 286 (see FIG. 2C). As discussed further below, SN(s) 236 and WI(s) 238 handle the cast-in of cache lines into L3 cache 232 in response to lateral castout (LCO) commands received from other L3 caches 232. In the described embodiment, SN(s) 236 are used to handle cast-ins that require no data movement and thus preferably do not include the inbound data management constructs, while WI(s) 238 are employed to handle LCO commands requiring data movement and accordingly include inbound data management constructs (making them more costly than SN(s) 236). WIs 238 further handle the injection of cache lines into L3 cache 232 by I/O devices 216.

FIG. 2B also illustrates an exemplary flow of requests, data and coherence communication within the cache memory hierarchy of processor core 202. In the depicted arrangement, dashed lines represent the flow of requests and coherence commands, and solid lines represent data flow.

As shown, processor core 202 transmits load requests 240 to, and receives load data 242 from L2 cache 230. Processor core 202 also transmits store requests 244 and associated store data 246 to gathering logic 248, which gathers the store data associated with multiple requests into one cache line of data and transmits the gathered store data 249 to L2 cache 230 in conjunction with one gathered store request 247. Although illustrated separately for clarity, gathering logic 248 may be incorporated within processor core 202 and/or L2 cache 230.

In response to a memory access request from processor core 202, L2 cache 230 assigns one of a plurality of read-claim (RC) machines 231 to service the memory access request. Servicing the memory access request may entail the RC 231 of L2 cache 230 transmitting system coherence commands 250 to coherence management logic 210 of FIG. 2A for compilation and/or transmission on the interconnect fabric. The RC 231 of L2 cache 230 may also transmit write data 254 to, and receives load data 252 from IMC 206 and/or interconnect logic 212. The RC 231 of L2 cache 230 may also request load data from L3 cache 232 via a load request 260 and receive load data 262 from L3 cache 232. L2 cache 230 further includes a plurality of snoop (SN) machines 233 to service memory access requests (e.g., read requests, read-with-intent-to-modify requests, and kill requests) snooped on the interconnect fabric.

To remove a cache line from L2 cache 230, L2 cache 230 may issue a cast-in request to L3 cache 232, which in turn receives the cache line as cast-in data 266. Similar to L2 cache 230, L3 cache 232 may interact with IMCs 206 and/or cache memories in other cache hierarchies by issuing system coherence commands 270, receiving prefetch data 272 and/or cast-in data 273, and/or transmitting write data 274.

Although the illustrated cache hierarchy includes only three levels of cache, those skilled in the art will appreciate that alternative embodiments may include additional levels (L4, L5, etc.) of on-chip or off-chip in-line or lookaside cache, which may be fully inclusive, partially inclusive, or non-inclusive of the contents the upper levels of cache. Further, any of the various levels of the cache hierarchy may be private to a particular processor core 202 or shared by multiple processor cores 202. For example, in some implementations, the cache hierarchy includes an L2 cache 230 for each processor core 202, with multiple of the L2 caches 230 sharing a common L3 victim cache 232.

Figure 3:
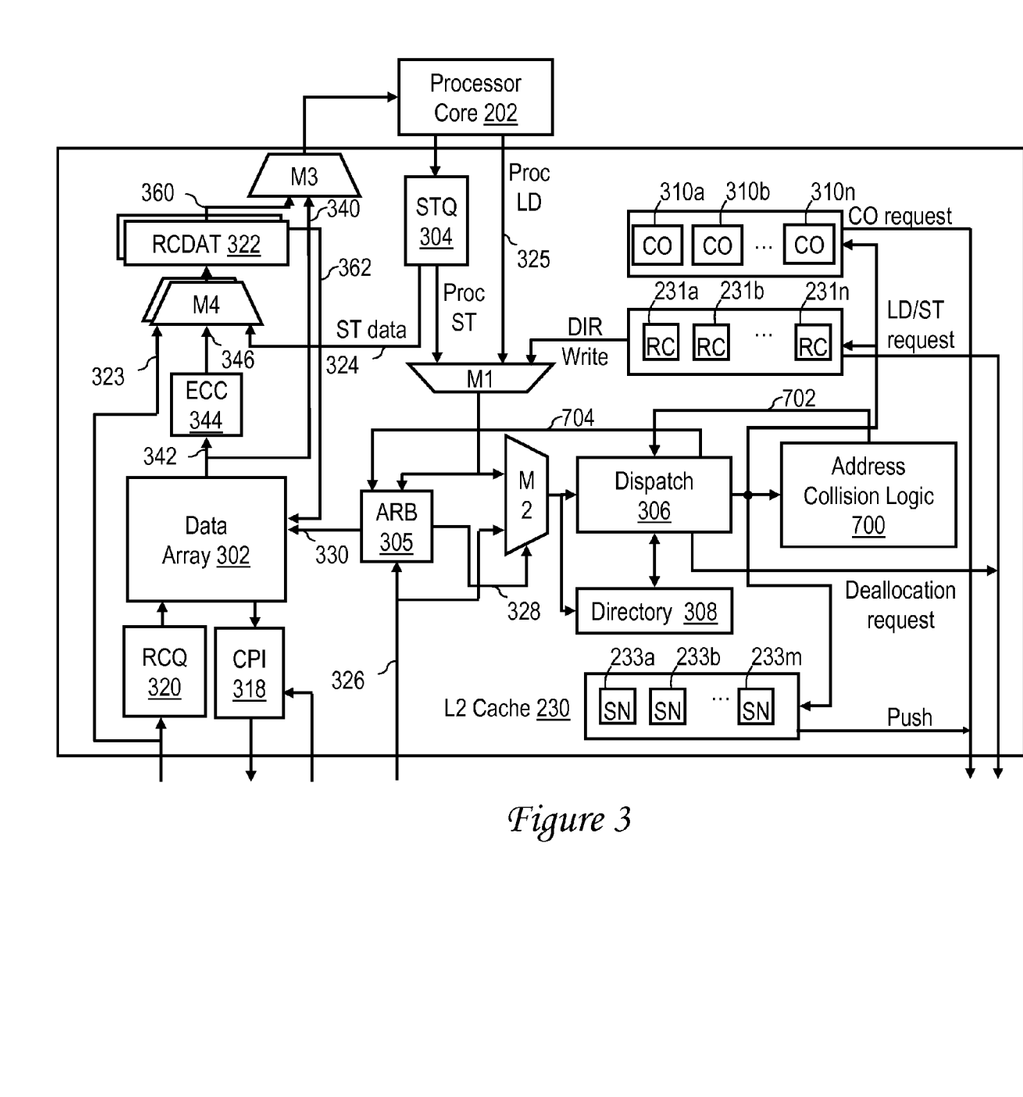
FIG. 3 illustrates an exemplary embodiment of a lower level cache memory from FIG. 2B.

With reference now to FIG. 3, there is illustrated a high level block diagram of an exemplary embodiment of one of L2 caches 230. (L3 caches 232 may be similarly implemented.) As shown, L2 cache 230 includes a data array 302 and a directory 308 of the contents of data array 302, embodiments of which are described in greater detail below with reference to FIG. 4. L2 cache 230 also includes additional control logic (collectively referred to in the art as a "cache controller"), which in the depicted embodiment includes multiple (e.g., 16) Read-Claim (RC) machines 231a-231n for independently and concurrently servicing load (LD) and store (ST) requests received from the affiliated processor core 202. In order to service remote memory access requests originating from processor cores 202 other than the affiliated processor core 202, the control logic of L2 cache 230 includes multiple snoop (SN) machines 233a-233m. Each snoop machine 233 can independently and concurrently handle a remote memory access request "snooped" from local interconnect 114. As will be appreciated, the servicing of memory access requests by RC machines 312 may require the replacement or invalidation of memory blocks within data array 302. Accordingly, L2 cache 230 includes CO (castout) machines 310 that manage the removal and writeback of memory blocks from data array 302.

The control logic of L2 cache 230 further includes an arbiter 305 that controls multiplexers M1-M2 to order the processing of local memory access and cache management requests received from affiliated processor core 200 and remote requests snooped on local interconnect 114. Requests are forwarded in accordance with the arbitration policy implemented by arbiter 305 to a dispatch pipeline 306 in which each request is processed with respect to directory 308 over a given number of cycles.

The control logic of L2 cache 230 also includes an RC queue (RCQ) 320 and a Castout Push Intervention (CPI) queue 318 that respectively buffer data being inserted into and removed from data array 302. RC queue 320 includes a number of buffer entries that each individually correspond to a particular one of RC machines 231 such that each RC machine 231 that is dispatched retrieves data from only the designated buffer entry. Similarly, CPI queue 318 includes a number of buffer entries that each individually correspond to a particular one of the castout machines 310 and snoop machines 233, such that each CO machine 310 and each snoop machine 233 that is dispatched retrieves data from only the respective designated CPI buffer entry.

Each RC machine 231 also has assigned to it a respective one of multiple RC data (RCDAT) buffers 322 for buffering a memory block read from data array 302 and/or received from local interconnect 114 via reload bus 323. The RCDAT buffer 322 assigned to each RC machine 312 is preferably constructed with connections and functionality corresponding to the memory access requests that may be serviced by the associated RC machine 312. At least some of RCDAT buffers 322 have an associated store data multiplexer M4 that selects data bytes from among its inputs for buffering in the RCDAT buffer 322 in response unillustrated select signals generated by arbiter 305.

In operation, processor store requests comprising a transaction type (ttype), target real address and store data are received from the affiliated processor core 202 within a store queue (STQ) 304. From STQ 304, the store data are transmitted to store data multiplexer M4 via data path 324, and the store type and target address are passed to multiplexer M1. Multiplexer M1 also receives as inputs processor load and deallocation requests sent by processor core 202 via load pipeline 325 and directory write requests sent by RC machines 312. In response to unillustrated select signals generated by arbiter 305, multiplexer M1 selects one of its input requests to forward to multiplexer M2, which additionally receives as an input a remote request received from local interconnect 114 via remote request path 326. Arbiter 305 schedules local and remote requests for processing and, based upon the scheduling, generates a sequence of select signals 328. In response to select signals 328 generated by arbiter 305, multiplexer M2 selects either the local request received from multiplexer M1 or the remote request snooped from local interconnect 114 as the next request to be processed.

Still referring to FIG. 3, the request selected for processing by arbiter 305 is placed by multiplexer M2 into dispatch pipeline 306. Dispatch pipeline 306 preferably is implemented as a fixed duration pipeline in which each of multiple possible overlapping requests is processed for a predetermined number of clock cycles.

During the first cycle of processing within dispatch pipeline 306, a 1-cycle directory read is performed utilizing the target address of the request to determine if the target address hits or misses in directory 308, and if the target address hits, the coherency state of the memory block within directory 308. The directory information, which includes a hit/miss indication and the coherency state of the memory block, is returned by directory 308 to dispatch pipeline 306. As will be appreciated, no action is generally taken within an L2 cache 230 in response to miss on a remote memory access request; such remote memory requests are accordingly discarded from dispatch pipeline 306. However, in the event of a hit or miss on a local request or a hit on a remote memory access request, L2 cache 230 will service the request, which for requests that cannot be serviced entirely within processing unit 104, may entail communication on local interconnect 114.

At a predetermined time during processing of a memory access request within dispatch pipeline 306, arbiter 305 transmits the request address to data array 302 via address and control path 330 to initiate a cache read of the target cache line specified by the target address, thus dissipating additional power. The memory block read from data array 302 is transmitted via data path 342 to Error Correcting Code (ECC) logic 344, which checks the memory block for errors and, if possible, corrects any detected errors. For processor load requests, the memory block is also transmitted to load data multiplexer M3 via data path 340 for forwarding to the affiliated processor core 202.

At the last cycle of the processing of a memory access request within dispatch pipeline 306, dispatch pipeline 306 makes a dispatch determination based, for example, on (1) the presence of an address collision between the target address and a previously received target address currently being processed by a castout machine 310, snoop machine 233 or RC machine 231, (2) the directory information, and (3) availability of an RC machine 231 or snoop machine 233 to process the memory access request. If dispatch pipeline 306 makes a dispatch determination that the memory access request is to be dispatched, the memory access request is dispatched from dispatch pipeline 306 to an RC machine 231 or a snoop machine 233. If the memory access request fails dispatch, the failure is signaled to the requestor (e.g., local or remote processor core 202) by a retry response. The requestor may subsequently retry the failed memory access request, if necessary.

While an RC machine 231 is processing a local memory access request, the RC machine 231 has a busy status and is not available to service another request. While an RC machine 231 has a busy status, the RC machine 231 may perform a directory write to update the relevant entry of directory 308, if necessary. In addition, the RC machine 231 may perform a cache write to update the relevant target cache line stored in data array 302. The directory write and data array write may be scheduled by arbiter 305 during any interval in which dispatch pipeline 306 is not already processing other requests according to the fixed scheduling of directory reads and data array reads. When all operations for the given local memory access request have been completed, the RC machine 312 returns to an unbusy state and is thus available for dispatch to service another request.

Figure 4:
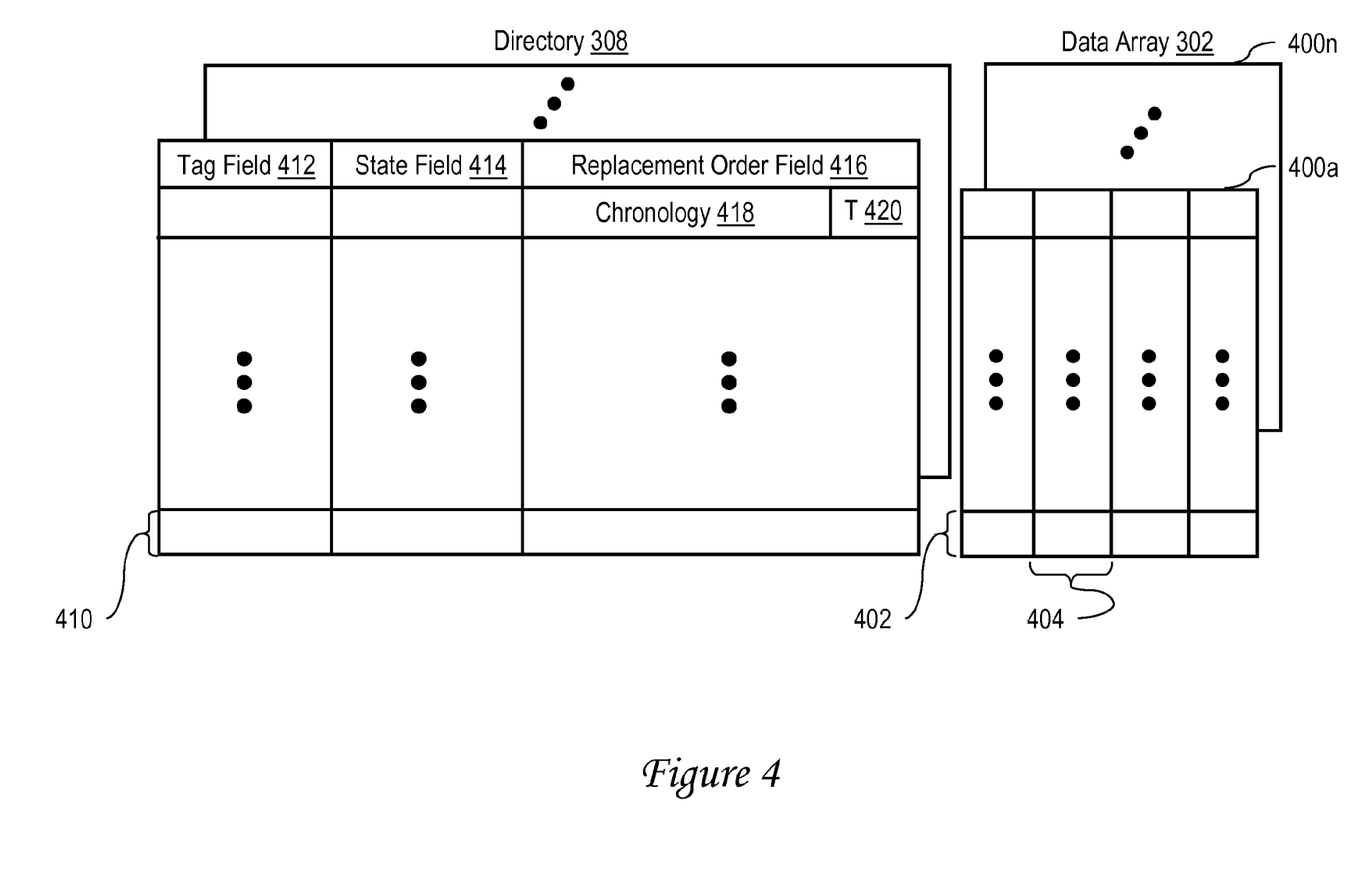
FIG. 4 depicts an exemplary embodiment of a cache directory of a lower level cache.

Referring now to FIG. 4, there is depicted a more detailed block diagram of an exemplary embodiment of data array 302 and directory 308 and of an L2 cache 230. (The data array of L3 caches 232 may be implemented similarly.) In the depicted embodiment, data array has a set-associative organization and accordingly including multiple ways 400a-400n. Each way 400 includes multiple entries 402, which in the depicted embodiment each provide temporary storage for up to a full memory block of data, e.g., 128 bytes. Each cache line or memory block of data is logically formed of multiple granules 404 (in this example, four granules of 32 bytes each) that may correspond in size, for example, to the smallest allowable access to system memories 108a-108d. In some embodiments, granules 404 may be individually accessed and cached in data array 302.

As in conventional set-associative caches, memory locations in system memories 108 are mapped to particular congruence classes within data arrays 302 utilizing predetermined index bits within the system memory (real) addresses. The particular cache lines stored within data array 302 are recorded in cache directory 302, which contains one directory entry 410 for each cache line in data array 302. As understood by those skilled in the art, each directory entry 410 in directory 308 comprises at least a tag field 412, which specifies the particular cache line stored in the corresponding entry 402 of data array 302 utilizing a tag portion of the corresponding real address, a state field 414, which indicates the coherence state of the cache line (e.g., according to the well-known MESI coherency protocol or a variant thereof), and a replacement order field 416.

Replacement order field 416 includes a chronology field 418 indicating a relative replacement order for the cache line with respect to other cache lines in the same congruence class. In addition, in some (but not all) embodiments, replacement order field 420 further includes a transient (T) field 420, which if set, indicates that the associated cache line has been the target of a deallocation request of the affiliated processor core 202 and accordingly should be preferred for deallocation from the cache hierarchy (e.g., as the Least Recently Used member or other preferred replacement order position).

Figure 5:
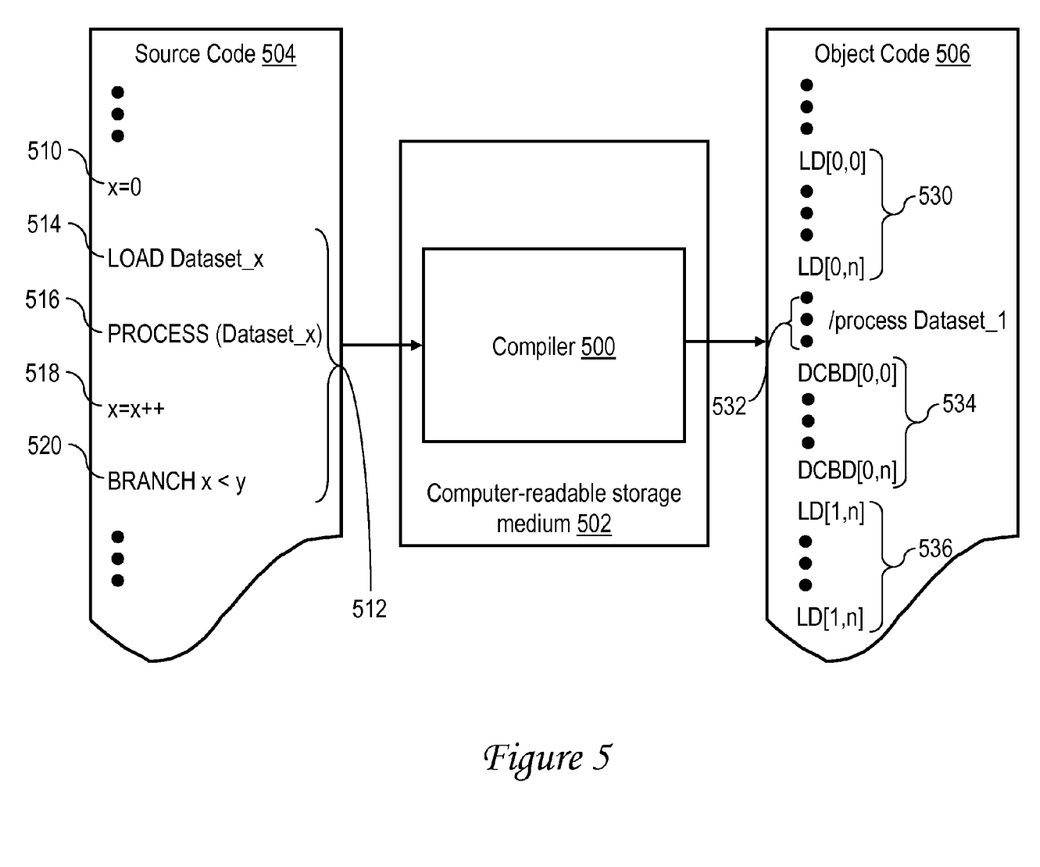
FIG. 5 illustrates the operation of a compiler in accordance with one embodiment.

With reference now to FIG. 5, there is illustrated an exemplary data flow diagram of a process by which a compiler compiles source code with an explicit deallocate instruction that identifies a target cache line to be preferentially deallocated from a cache memory hierarchy. In the depicted process, program code, such as compiler 500, which is stored on a tangible computer-readable storage medium 502 such as disk or memory storage, executes on a data processing system (e.g., data processing system 100 of FIG. 1) to receive pre-processed code such as source code 502 or intermediate code, to compile the pre-processed code, and to output post-processed code such as object code 506.

As indicated, source code 504 includes an initialization instruction 510 that initializes a loop variable x of a processing loop 512 to an initial value (e.g., 0). In processing loop 512, source code 504 includes a LOAD command 514 that specifies a dataset (e.g., a first array or database) to be loaded from a memory hierarchy and one or more commands represented by PROCESS command 516 that specify processing to be performed on the dataset. Processing loop 512 further includes instruction 518, which increments the loop variable, and a BRANCH command 520 that causes processing loop 512 to iterate if the loop variable has not attained a terminal value (represented by variable y).

Figure 6:
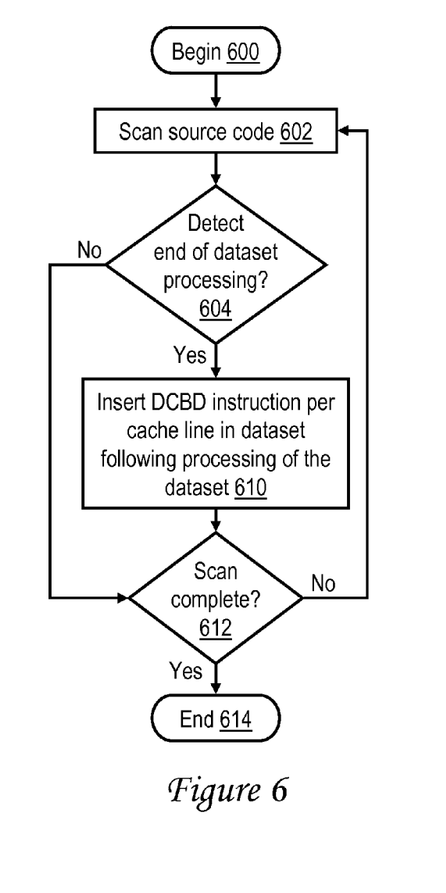
FIG. 6 is a high level logical flowchart of an exemplary method of compiling source code to generate object code in accordance with one embodiment.

Referring now to FIG. 6, there is depicted a high level logical flowchart of an exemplary process by which program code, such as compiler 500, processes pre-processed code, such as source code 504, to obtain post-processed code, such as object code 506. As with the other logical flowcharts presented herein, the illustrated operations are depicted in a logical rather than chronological order. Consequently, in many cases, certain of the operations shown may be performed concurrently and/or in a different order than that illustrated. The illustrated process can be performed, for example, as part of the code optimization operations of compiler 500.

As shown, the process begins at block 600 and then proceeds to blocks 602-604, which depicts compiler 500 scanning a section of source code 504 to detect termination of processing of a dataset. For example, in exemplary source code 504 the end of processing of a dataset may be detected when the end of an iteration of processing loop 512 is reached. If compiler 500 fails to detect the end of a processing of a dataset in the current section, the process passes to block 612, which illustrates compiler 500 determining whether its scan of source code 504 is complete. If so, the process illustrated in FIG. 6 terminates at block 614. If, however, compiler 500 determines at block 612 that its scan of source code 504 is not complete, the process returns to block 602, which has been described.

Referring again to block 604, in response to compiler 500 detecting the end of processing a dataset, compiler 500 inserts into object code 506 one deallocate instruction (referred to herein as a Data Cache Block Deallocate (DCDB)) for each cache line in the dataset that has completed processing. Following block 610, the process passes to block 612, which has been described.

Referring again to FIG. 5, the exemplary portion of object code 506 depicted in FIG. 5 includes a first load sequence 530 of multiple load (LD) instructions generated by compiler 500 to implement the initial iteration of LOAD command 514. As indicated, load sequence 530 loads the n+1 elements of Dataset_0 from system memories 108 into the registers and cache hierarchy of a processor core 202. Following load sequence 530, compiler 532 has included in object code 506 one or more instructions 532 that implement the processing represented by PROCESS command 516. Thereafter, as described with reference to block 610, compiler 500 inserts into object code 506 a deallocation sequence 534, which preferably includes a deallocate (e.g., DCBD) instruction for each of the n+1 elements of Dataset_0. Thereafter, compiler 500 inserts a second load sequence 536 including multiple LD instructions to implement the next iteration of LOAD command 514 by loading the n+1 elements of Dataset_1 from system memories 108 into the registers and cache hierarchy of a processor core 202.

It should be noted that, in addition to being generated automatically by a compiler as shown in FIG. 5, deallocate instructions may alternatively or additionally be directed coded by a human coder or an automated code generator. Further, it should be noted that if a deallocate instruction is erroneously inserted in object code 506 prior to the last reference to the target cache line of the deallocate instruction (e.g., compiler 500 inserts a DCBD instruction targeting data element[0,n] prior to an instruction referencing data element [0,n] in the processing of data element[1,0]), the premature inclusion of a deallocate instruction does cause any processing error and does not necessarily diminish the performance of the instruction subsequently referencing the data element by increasing access latency. Access latency is not necessarily increased because the deallocate instruction does not force deallocation of the target cache line, but merely makes deallocation more likely. Thus, depending on address access patterns and hit rates, a target cache line of a deallocate instruction may be retained in cache memory for many cache accesses following execution of the deallocate instruction, enabling a subsequent instruction to potentially access the target cache line without incurring the latency penalty associated with again retrieving the target cache line from system memory.

Figure 7:
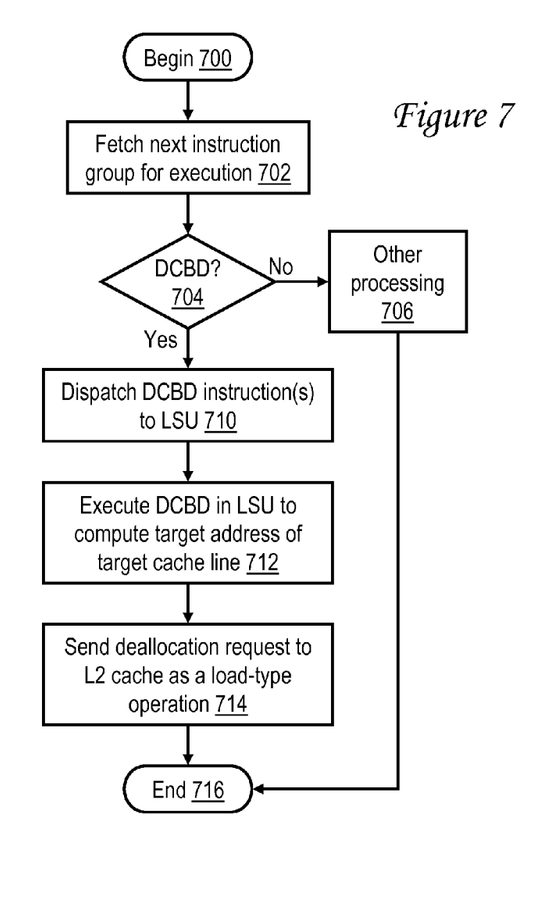
FIG. 7 is a high level logical flowchart of an exemplary method by which a processor core executes a deallocate instruction in accordance with one embodiment.

With reference now to FIG. 7, there is illustrated a high level logical flowchart of an exemplary method by which a processor core 202 executes a deallocate instruction in accordance with one embodiment. The process begins at block 700 and then proceeds to block 702, which illustrates ISU 201 of a processor core 202 retrieving a next instruction group for execution from the memory hierarchy. ISU 201 decodes the instructions in the instruction group and, as shown at block 704, determines if any of the instructions in the instruction group is a deallocate instruction (e.g., DCBD). For instructions other than deallocate instructions, ISU 201 performs possibly conventional processing, as shown at block 706. ISU 201 dispatches the deallocate instruction(s) in the instruction group to LSU 205 (block 710), which executes each deallocate instruction to compute the target address of the target cache line of the deallocate instruction (block 712). After possible translation of the target address (e.g., effective-to-real translation) computed by LSU 205, processor core 202 sends a deallocation request corresponding to the deallocate instruction to its affiliated L2 cache 230 (block 714), regardless of whether or not the target address hits in L1 cache 204. As noted above, the deallocation request, which preferably specifies a load transaction type and the computed target address, is preferably transmitted to L2 cache 230 via load pipeline 325. One consequence of implementing the deallocation request as a load-type request rather than a store-type request is that the deallocation request affects the caching of the target cache line in only the cache hierarchy of the particular processor core 202 that executes the corresponding deallocate instruction. Consequently, processing of the deallocation request is not delayed by making the deallocation request visible to all cache hierarchies throughout data processing system 100 or the presence of barrier operations (e.g., SYNCs) utilized in the presence of a weakly-ordered storage system to synchronize storage-modifying operations across all cache hierarchies and system memories 108. Following block 714, the process depicted in FIG. 7 ends at block 716.

Figure 8:
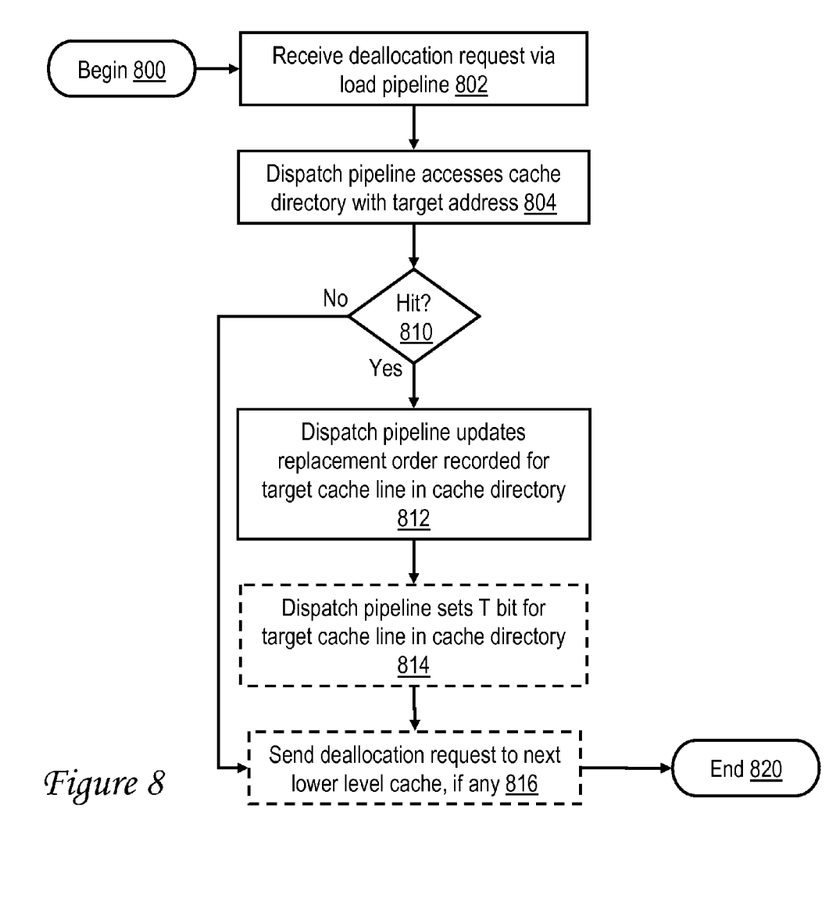
FIG. 8 is a high level logical flowchart of an exemplary method by which a lower level cache processes a deallocation request in accordance with one embodiment.

Referring now to FIG. 8, there is depicted a high level logical flowchart of an exemplary method by which a lower level cache processes a deallocation request in accordance with one embodiment. The illustrated process begins at block 800 and then proceeds to block 802, which illustrates a lower level cache, such as an L2 cache 230, receiving a deallocation request from the affiliated processor core 202, preferably via load pipeline 325. As noted above with reference to FIG. 3, the deallocation request is loaded into dispatch pipeline 306, which accesses directory 308 utilizing the target address specified in the deallocation request.

If the target address does not hit (i.e., misses) in directory 308, no further processing of the deallocation request is performed in the lower level cache. Accordingly, in one embodiment, the deallocation request is simply discarded from dispatch pipeline 306, and the process ends at block 820. In an alternative embodiment, dispatch pipeline 306 forwards the deallocation request to the next lower level cache (e.g., L3 cache 232) in the cache hierarchy, as depicted at optional block 816. In embodiments including block 816, the deallocation request can be processed at the next lower level cache in the same manner as depicted in FIG. 8. In at least some embodiments, finer grained cache management is implemented by including in the deallocation request a hierarchy level indicator that indicates how far down the cache hierarchy the deallocation request is to be transmitted. Thus, for example, a deallocation request may specify that the deallocation request is to be processed at the L2 and L3 caches, but not at the still lower level L4 cache. Following block 816, the process shown in FIG. 8 ends at block 820.

Returning to block 810, in response to the target address of the deallocation request hitting in directory 308, dispatch pipeline 306 updates the replacement order recorded for the target cache line to demote the target cache line, thus making the target cache line more likely to be selected as the victim cache line to be evicted from its congruence class upon a subsequent miss of a memory access request mapping to that congruence class (block 812). For example, if L2 cache 230 is implementing an LRU or pseudo-LRU replacement policy, dispatch pipeline 306 may update chronology field 418 of the replacement order field 416 of the directory entry 410 associated with the target cache line to LRU (or another predetermined chronology position more likely to be evicted, such as LRU+1). If L2 cache 230 is implementing a different replacement policy, dispatch pipeline 306 updates replacement order field 416 accordingly to increase the probability that the target cache line will be selected as the victim cache line to be evicted from its congruence class. While updating the replacement order for the target cache line, dispatch pipeline 306 preferably refrains from modifying the tag field 412 or state field 414 of the directory entry 410 associated with target cache line, from accessing the target cache line in data array 302, and from dispatching an RC machine 231 to handle the deallocation request. By servicing the deallocation request entirely in dispatch pipeline 306 with reference to directory 308, a sequence of deallocation requests, such as deallocation sequence 534 of FIG. 5, can be serviced at the maximum dispatch rate of dispatch pipeline 306.

As depicted at optional block 814, in performing the update to the directory entry 410 associated with the target cache line of the deallocation request, dispatch pipeline 306 also sets T (transient) field 420 in the directory entry 410 associated with the target cache line. By setting T field 420, the fact that the associated cache line was the target of an explicit deallocation request of the processor core 202 can be retained as the target cache line traverses the cache hierarchy. Thus, when the target cache line is eventually evicted and sent to a lower level (e.g., L3) cache, the lower level cache can immediately place the target cache line at a selected position in the replacement order that makes eviction of the target cache line more likely (e.g., LRU or LRU+1 rather than MRU).

In addition to block 812 and, if implemented, optional block 814, the process performed in the case of a cache hit can optionally also include sending the deallocation request to one or more lower levels of cache, as depicted at block 816 and as described above. The process given in FIG. 8 thereafter ends at block 820.

Figure 9:
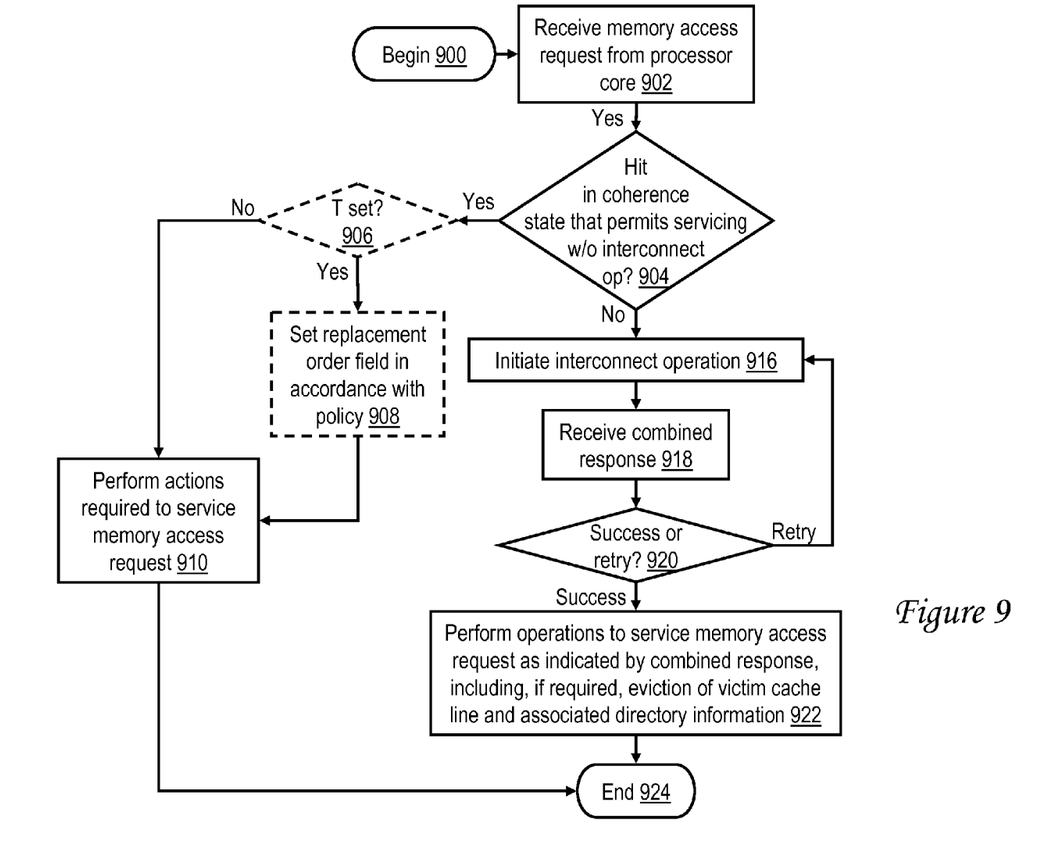
FIG. 9 is a high level logical flowchart of an exemplary method by which a lower level cache services a memory access request in accordance with one embodiment.

With reference now to FIG. 9, there is illustrated a high level logical flowchart of an exemplary method by which a lower level cache services a memory access request of an affiliated processor core 202 in accordance with one embodiment. The process depicted in FIG. 9 begins at block 900 and proceeds to block 902, which illustrates a lower level cache, such as an L2 cache 230, receiving a memory access request (e.g., a load request or store request) from an affiliated processor core 202. As described above, the request is processed in dispatch pipeline 306, which performs a lookup in directory 308 to access directory information of the target cache line, dispatches an RC machine 231 to service the memory access request, and passes the memory access request and the directory information for the target cache line to the dispatched RC machine 231 for handling.

At block 904, the RC machine 231 determines by reference to the directory information of the target cache line if the target address of the memory access request hit in directory 308 in a coherence state that permits the memory access request to be serviced without issuance of an operation on the interconnect fabric. As will be appreciated, the lower level cache can generally satisfy a non-storage-modifying request without issuing an interconnect operation if state field 414 indicates any data-valid coherency state for the target cache line. The lower level cache generally cannot satisfy a storage-modifying request without issuing an interconnect operation unless state field 414 indicates a Modified or Exclusive (or similar) coherency state for the target cache line.

In response to an affirmative determination at block 904, the process proceeds in some embodiments to block 910, which depicts the RC machine 231 performing the actions necessary to service the memory access request without issuance of an operation on the interconnect fabric (e.g., issuing a directory write request and/or providing load data to processor core 202 or writing store data to data array 302). In embodiments implementing T field 420, the RC machine 231 makes an additional determination at block 906 whether or not the directory information received from dispatch pipeline 306 indicates that the T field 420 of the target cache line is set to identify the target cache line as a target of a previous deallocation request of the affiliated processor core 202. If not, the process passes to block 910, which has been described. If, however, RC machine 231 determines at block 906 that the T field 420 is set, the RC machine 231 includes in a directory write request a request to set the replacement order field 416 of the target cache line of the memory access request in accordance with a desired policy (block 908). For example, in various embodiments, RC machine 231 may set the target memory block to a predetermined replacement order position (e.g., LRU), may increment the replacement order position by one (e.g., update the target memory block from LRU to LRU+1), or may reset T field 420 and set the replacement order position to Most Recently Used (MRU). The policy for handling a hit on a cache line with a set T field 420 is preferably selected from among these embodiments to match the anticipated data access patterns of the current workload. The process passes from block 908 to block 910, which has been described. Following block 910, the process illustrated in FIG. 9 terminates at block 924.

Returning to block 904, in response to RC machine 231 determining that the memory access request cannot be serviced without issuing an interconnect operation, the process proceeds to block 916. Block 916 illustrates RC machine 231 issuing an appropriate interconnect operation on the interconnect fabric to enable the memory access request to be serviced. In general, the interconnect operation includes at least a transaction type and a target address. Following block 916, the process continues to block 918, which depicts RC machine 231 receiving a combined response from coherence management logic 210 (FIG. 2). As previously discussed, the combined response is generated by response logic 210 from partial responses of snoopers within data processing system 100 and represents a system wide response to the memory access request.

The process continues to block 920, which shows RC machine 231 determining if the combined response of the interconnect operation indicates "success" or "retry". If the combined response indicates "retry" (that the request cannot be fulfilled at the current time and must be retried), the process returns to block 916, which has been described. If the combined response indicates "success" (that the request can be fulfilled at the current time), the process continues to block 922, which illustrates RC machine 231 performing operations to service the memory access request, as indicated by the combined response. For example, if the request of the interconnect operation was a read operation, RC machine 231 causes the requested data received from the interconnect fabric to be supplied to the processor core 202, the read data to be installed in data array 302, and update to be performed to directory 308. If on the other hand, the interconnect operation was a store-type operation, RC machine 231 causes cache array 302 to be updated with the store data provided by the requesting processing unit 202 and directory 308 to be updated.

In either case, if the target cache line did not reside in data array 302 prior to the interconnect operation, RC machine 231 causes a CO machine 310 to be dispatched to evict a victim cache line and associated directory information from the congruence class to which the target address of the memory access request maps. If the lower level cache is an L2 cache 230, CO machine 310 preferably casts out the victim cache line to one of L3 caches 232 via a castout operation. In embodiments in which T fields 420 are implemented within directory entries 410, the directory information transmitted to the L3 cache 232 in castout operation includes the setting of the T field 420 (i.e., an indication of whether the cache line was the target of a previous deallocation request of the affiliated processor core 202). Following block 922, the exemplary process depicted in FIG. 9 terminates at block 924.

Figure 10:
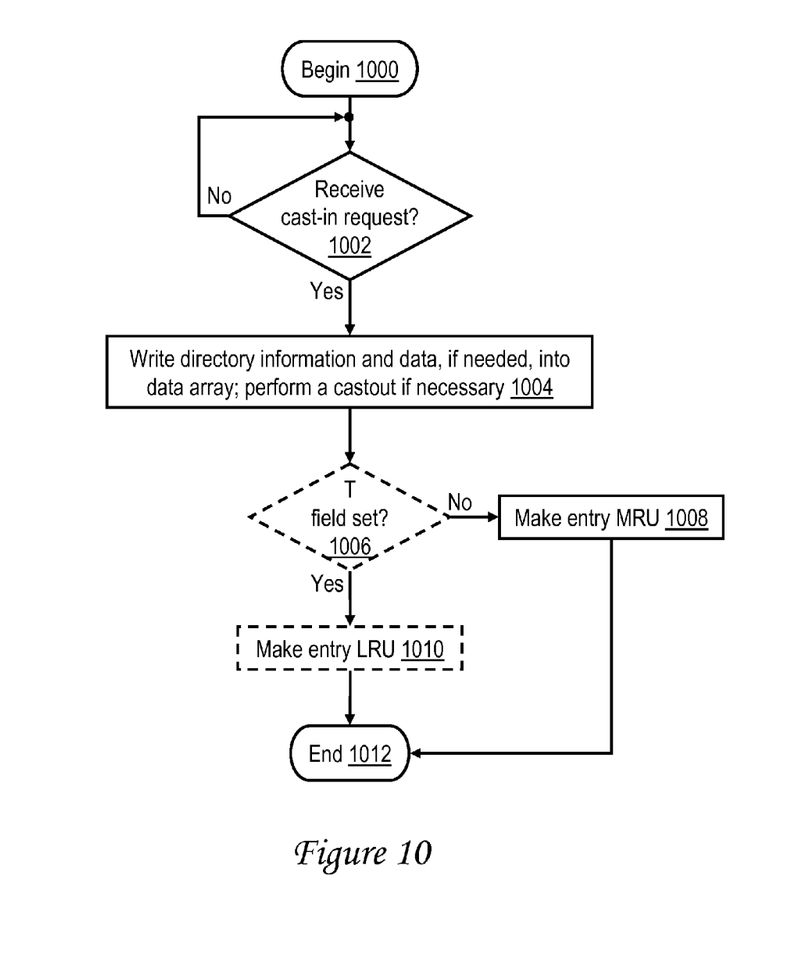
FIG. 10 is a high level logical flowchart of an exemplary method by which a lower level cache services a cast-in request in accordance with one embodiment.

Referring now to FIG. 10, there is depicted a high level logical flowchart of an exemplary process by which a lower level cache, hereinafter assumed to be an L3 cache 232, handles a castout of a higher level cache, hereinafter assumed to be an L2 cache 230, in accordance with one embodiment. The process begins at block 1000 of FIG. 10 and then proceeds to block 1002, at which the process iterates until the L3 cache 232 receives a cast-in request 264 from the associated L2 cache 230. In response to receipt of a cast-in request 264, L3 cache 232 writes the directory information and data, if any, received in the cast-in request 264 in the directory and data array, respectively, of L3 cache 232 (block 1004). Depending on the coherence protocol implemented in the data processing system 100, the castout cache line may be associated with a different coherence state in L3 cache 232 than the castout cache line had when evicted from L2 cache 230.

In embodiments in which T field 420 is not implemented, L3 cache 232 sets the replacement order field 416 in the L3 cache directory for the cache line to MRU, as shown at block 1008. In alternative embodiments that implement T field 420, L3 cache 232 also checks to see if the T field 420 associated with the castout cache line is set in the directory information supplied in the cast-in request 264 (block 1006). If not, the process proceeds to block 1008, as has been described. If, however, L3 cache 232 determines at block 1006 that the T field 420 associated with the castout cache line is set, L3 cache 232 sets the replacement order field 416 for the cache line to a designated replacement order position that makes it more likely for the cache line to be evicted from L3 cache 232 (e.g., LRU or LRU+1) in response to a subsequent cast-in request 264, as shown at block 1010. Following either block 1008 or block 1010, the process shown in FIG. 10 ends at block 1012.

In at least one embodiment, a data processing system includes a processor core supported by upper and lower level caches. In response to executing a deallocate instruction in the processor core, a deallocation request is sent from the processor core to the lower level cache, the deallocation request specifying a target address associated with a target cache line. In response to receipt of the deallocation request at the lower level cache, a determination is made if the target address hits in the lower level cache. In response to determining that the target address hits in the lower level cache, the target cache line is retained in a data array of the lower level cache and a replacement order field in a directory of the lower level cache is updated such that the target cache line is more likely to be evicted from the lower level cache in response to a subsequent cache miss.

In at least one embodiment, in response to a subsequent cache miss to the congruence class including target cache line, the lower level cache casts out the target cache line to a still lower level cache with an indication that the target cache line was a target of a previous deallocation request of the processor core. In response to the indication, the replacement order field in a directory of the still lower level cache is updated such that the target cache line is more likely to be evicted from the still lower level cache.

While one or more embodiments have been particularly shown and described, it will be understood by those skilled in the art that various changes in form and detail may be made therein without departing from the spirit and scope of the invention. For example, although aspects of the present invention have been described with respect to data processing system hardware, it should be understood that one or more embodiments of the present invention may alternatively be implemented as a program product for use with a data processing system. Such program product(s) include(s) a tangible computer readable storage device/medium that stores program code that directs the functions of the present invention. The computer readable storage device/medium may be implemented, for example, as a CD-ROM, DVD, diskette or hard disk, system memory, flash memory, etc.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A method of data processing in a data processing system including a processor core supported by upper and lower level caches, the method comprising:
the processor core executing a deallocate instruction at completion of processing of a dataset including a target cache line and a plurality of other cache lines to promote eviction of the dataset from the lower level cache;
in response to executing the deallocate instruction in the processor core, sending a deallocation request from the processor core to the lower level cache, the deallocation request specifying a target address associated with the target cache line;
in response to receipt of the deallocation request at the lower level cache, determining if the target address hits in the lower level cache;
in response to determining that the target address hits in the lower level cache, retaining the target cache line in a data array of the lower level cache and updating a replacement order field in a directory of the lower level cache such that the target cache line is more likely to be evicted from the lower level cache in response to a subsequent cache miss in a congruence class including the target cache line; and
in response to the subsequent cache miss, casting out the target cache line to the lower level cache with an indication that the target cache line was a target of a previous deallocation request of the processor core.

2. The method of claim 1, wherein updating the replacement order field includes making the target cache line least recently used (LRU).

3. The method of claim 1, and further comprising:
in response to determining that the target address hits in the lower level cache, setting a field in the directory of the lower level cache to indicate that the target cache line was a target of the deallocation request of the processor core.

4. The method of claim 1, wherein:
the lower level cache includes a load and store pipelines for data access requests of the processor core; and
sending the deallocation request includes sending the deallocation request to the load pipeline of the lower level cache.

5. The method of claim 1, wherein:
the lower level cache includes a plurality of state machines that service processor data access requests; and
the retaining and the updating are performed without allocation of one of the plurality of state machines to the deallocation request.

6. The method of claim 1, and further comprising:
in response to determining that the target address hits in the lower level cache, retaining a previous coherence state associated with the target cache line in the cache directory.

7. A method of data processing in a data processing system including a processor core supported by upper and lower level caches, the method comprising:
in response to executing a deallocate instruction in the processor core, sending a deallocation request from the processor core to the lower level cache, the deallocation request specifying a target address associated with a target cache line;
in response to receipt of the deallocation request at the lower level cache, determining if the target address hits in the lower level cache;
in response to determining that the target address hits in the lower level cache, retaining the target cache line in a data array of the lower level cache and updating a replacement order field in a directory of the lower level cache such that the target cache line is more likely to be evicted from the lower level cache in response to a subsequent cache miss in a congruence class including the target cache line; and
in response to the subsequent cache miss, casting out the target cache line to the lower level cache with an indication that the target cache line was a target of a previous deallocation request of the processor core, wherein the casting out includes:
transmitting a cast-in request from the lower level cache to a still lower level cache, the cast-in request including the indication; and
in response to the cast-in request, the still lower level cache, setting a replacement order field in a directory of the still lower level cache such that the target cache line is more likely to be evicted from the still lower level cache.

8. The method of claim 7, and further comprising:
in response to the cast-in request, the still lower level cache setting, in the directory of the still lower level cache, the indication for the target cache line.

9. A method of data processing in a data processing system including a processor core supported by upper and lower level caches, the method comprising:
in response to executing a deallocate instruction in the processor core, sending a deallocation request from the processor core to the lower level cache, the deallocation request specifying a target address associated with a target cache line;
in response to receipt of the deallocation request at the lower level cache, determining if the target address hits in the lower level cache;
in response to determining that the target address hits in the lower level cache, retaining the target cache line in a data array of the lower level cache and updating a replacement order field in a directory of the lower level cache such that the target cache line is more likely to be evicted from the lower level cache in response to a subsequent cache miss in a congruence class including the target cache line;
in response to the subsequent cache miss, casting out the target cache line to the lower level cache with an indication that the target cache line was a target of a previous deallocation request of the processor core; and
thereafter, in response to an access of the target cache line in the lower level cache prior to eviction of the target cache line from the lower level cache, refraining from updating the replacement order field.

\* \* \* \* \*